United States Patent
Harris et al.

(10) Patent No.: US 8,447,434 B1
(45) Date of Patent: May 21, 2013

(54) SYSTEM AND METHOD OF DYNAMIC AND DISTRIBUTED CONTROL WITH TOPOLOGY DISCOVERY IN AN ISOLATED POWER GRID

(75) Inventors: Robert J. Harris, Haslet, TX (US); Christopher D. Pylant, Arlington, TX (US)

(73) Assignee: Williams-Pyro, Inc., Fort Worth, TX (US)

( * ) Notice: Subject to any disclaimer, the term of this patent is extended or adjusted under 35 U.S.C. 154(b) by 56 days.

(21) Appl. No.: 13/014,712

(22) Filed: Jan. 26, 2011

(51) Int. Cl.
*G05B 11/01* (2006.01)

(52) U.S. Cl.
USPC ........... 700/286; 700/291; 700/297; 700/295; 700/19; 700/20

(58) Field of Classification Search
None
See application file for complete search history.

(56) References Cited

U.S. PATENT DOCUMENTS

| | | | | |
|---|---|---|---|---|
| 4,659,942 A * | 4/1987 | Volp | | 307/19 |
| 5,191,520 A * | 3/1993 | Eckersley | | 363/72 |
| 5,477,091 A * | 12/1995 | Fiorina et al. | | 307/66 |
| 7,567,523 B2 * | 7/2009 | Black et al. | | 370/255 |
| 7,635,927 B2 * | 12/2009 | Chang et al. | | 307/126 |
| 7,921,306 B2 * | 4/2011 | Dove | | 713/300 |
| 2004/0167732 A1 * | 8/2004 | Spitaels et al. | | 702/62 |
| 2006/0085346 A1 * | 4/2006 | Riley | | 705/51 |
| 2006/0282685 A1 * | 12/2006 | Bahali et al. | | 713/300 |
| 2010/0005331 A1 * | 1/2010 | Somasundaram et al. | | 713/340 |
| 2010/0142409 A1 * | 6/2010 | Fallon et al. | | 370/255 |
| 2011/0022245 A1 * | 1/2011 | Goodrum et al. | | 700/297 |
| 2012/0017102 A1 * | 1/2012 | Turicchi et al. | | 713/300 |
| 2012/0117392 A1 * | 5/2012 | Turicchi et al. | | 713/300 |

FOREIGN PATENT DOCUMENTS

WO    WO 2009123586 A1 * 10/2009

* cited by examiner

*Primary Examiner* — Kavita Padmanabhan
*Assistant Examiner* — Christopher E Everett
(74) *Attorney, Agent, or Firm* — Morani Patent Law, PC

(57) ABSTRACT

A system and method of dynamic distributed control with network topology discovery in an isolated distribution grid is provided. Source modules connect to AC generators and output high voltage DC power on ports. Load modules receive the high voltage DC power on connected ports and convert the DC power to AC power. Loads are connected to AC outlets on load modules. A source module discovers the connected network topology through a series of states following the reading of a configuration file. Each module has a microprocessor. Each microprocessor runs control algorithms using its adjacency map as input. Respective adjacency maps are monitored, compared, and amended as needed to maintain consistency across all adjacency maps, thus ensuring consistent distributed control of the power distribution grid.

14 Claims, 8 Drawing Sheets

| | Unit Identification | Unit Type |
|---|---|---|
| 241 → | Unit Identification | Unit Type |
| 240 → | Source Module Id | 2 byte unsigned integer |
| 227-1-1 → | Port 1 connection ID | 2 byte unsigned integer |
| 227-1-2 → | Port 1 cable integrity | 1 byte enumeration |
| 227-2-1 → | Port 2 connection ID | 2 byte unsigned integer |
| 227-2-2 → | Port 2 cable integrity | 1 byte enumeration |
| 227-3-1 → | Port 3 connection ID | 2 byte unsigned integer |
| 227-3-2 → | Port 3 cable integrity | 1 byte enumeration |
| 221-4-1 → | Generator Power | 4 byte single precision floating point |
| 221-4-2 → | Generator On/Off Status | 1 byte enumeration |
| | | |

Table 1 Source Module Map Entries
220

*Fig. 2A*

| | Unit Identification | Unit Type |
|---|---|---|
| 260 → | Load Module Id | 2 byte unsigned integer |
| 153-1-1 → | Port 1 connection ID | 2 byte unsigned integer |
| 153-1-2 → | Port 1 cable integrity | 1 byte enumeration |
| 153-2-1 → | Port 2 connection | 2 byte unsigned integer |
| 153-2-2 → | Port 2 cable integrity | 1 byte enumeration |
| 153-3-1 → | Port 3 connection ID | 2 byte unsigned integer |
| 153-3-2 → | Port 3 cable integrity | 1 byte enumeration |
| 155-1-1 → | Outlet 1 Priority | 1 byte unsigned integer |
| 155-1-2 → | Outlet 1 connected state | 1 byte enumeration |
| 155-1-3 → | Outlet 1 aggregate resistance | 4 byte single precision floating point |
| 155-2-1 → | Outlet 2 Priority | 1 byte unsigned integer |
| 155-2-2 → | Outlet 2 connected state | 1 byte enumertion |
| 155-2-3 → | Outlet 2 aggregate resistance | 4 byte single precision floating point |
| 155-3-1 → | Outlet 3 Priority | 1 byte unsigned integer |
| 155-3-2 → | Outlet 3 connected state | 1 byte enumeration |
| 155-3-3 → | Outlet 3 aggregate resistance | 4 byte single precision floating point |

Table 2 Load Module Map Entries
250

*Fig. 2B*

SYSTEM AND METHOD OF DYNAMIC AND DISTRIBUTED CONTROL WITH TOPOLOGY DISCOVERY IN AN ISOLATED POWER GRID

STATEMENT REGARDING FEDERALLY SPONSORED RESEARCH

This invention was made with government support under Contract No. W909MY-09-C-003 between the United States Army and Williams-Pyro, Inc. The government may have certain rights in the invention.

BACKGROUND OF THE INVENTION

The present invention relates generally to electrical power supply management and more particularly to a system and method for dynamic and distributed control in an isolated distribution grid.

Conventional electrical utility service has some reserve capacity available for interim peak demand periods. However, at times, the power demand may exceed the generation, transmission, or distribution capacity of electric utility companies. Load shedding may be scheduled or may be performed with little notice. Customers may employ emergency generators to ensure continuous power to critical loads.

Remote or off-grid power and distribution of the same may be desirable for multiple situations other than load shedding by the utility provider. Emergency power may be needed during, for example, natural disasters. Power to a remote area may be desired where transmission and/or distributions lines are non-existent or have insufficient capacity. Remote generators can supply power not only for emergency or temporary conditions but may even become a long term power source.

Power control systems are often designed into large facility power systems, however, the different components connecting into the power system may vary in design and manufacturer. In turn, the components may use different communication protocols, making communication expensive or unfeasible.

In simple conventional portable situations variable output of smaller generators may not be an option, with many having essentially two states, on and off. Optimizing the utilization of generated power may not be possible and since generators are often oversized to the load they are servicing, excess generation may not be stored and may go unused. It would be desirable to increase the system efficiency powered by one or more of these all or none generators by maintaining demand near generation output.

In some situations, it can become difficult to track the loading on a given generator. It may be challenging to keep an account of the ampere load on the distribution line or lines between the generator and respective loads. Loads may tie into the generator at locations remote from the generator, a means for tracking and managing remote loads may be needed to prevent overload conditions. Interim and cyclic loads also add to the challenge of providing adequate power generation and distribution capacity without excessive losses from unused capacity. There may be multiple customers or persons with access to the generation power and distribution lines who can add and subtract loads from the local power system at unscheduled times.

It would be desirable to afford the users the ability to modify the loading configuration on a generator or generators and automatically adjust the power distribution to accommodate the load changes with available generation capacity. It may be desirable for security or other reasons to provide a power generation and distribution system with distributed control, such that the loss of any one unit would not compromise the remaining power system.

SUMMARY OF THE INVENTION

The present invention addresses some of the issues presented above by providing a system and method for dynamic and distributed control of an isolated power grid comprising generation and distribution capacity. The present invention employs distributed control and automatically determines an initial distribution network topology. Aspects of the present invention are provided for summary purposes and are not intended to be all inclusive or exclusive. Embodiments of the present invention may have any of the aspects below.

One aspect of the present invention is the accommodation of ad hoc load and generation additions.

Another aspect of the present invention is to provide communication via point to point connections.

Another aspect of the present invention is the lack of a central command module or location.

Another aspect of the present invention is its user friendly operation, where users can add and subtract loads and the system automatically updates network parameters to reflect the user initiated change.

Yet another aspect of the present invention is the autonomous topology discovery of components in an isolated the power grid upon startup of the system.

Yet another aspect of the present invention is the autonomous update of the power grid topology upon ad hoc changes to the power grid.

Another aspect of the present invention is the use of source modules and load modules to monitor and control the power grid.

Another aspect of the present invention is the use of a dedicated microprocessor at each module.

Another aspect of the present invention is the use of consistent algorithms across modules.

Another aspect of the present invention is the use of identical algorithm inputs at each microprocessor.

Another aspect of the present invention is the use of adjacency maps as algorithm input.

Another aspect of the present invention is the capability to afford splitting of a single power grid into two or more power grids while adjusting the original distributed control and creating new distributed control of the new power grids.

Those skilled in the art will further appreciate the above-noted features and advantages of the invention together with other important aspects thereof upon reading the detailed description that follows in conjunction with the drawings.

BRIEF DESCRIPTION OF THE FIGURES

For more complete understanding of the features and advantages of the present invention, reference is now made to the detailed description of the invention along with the accompanying figures, wherein:

FIGS. 2A and 2B show exemplary source module map entries and load module map entries, respectively, in accordance with an exemplary embodiment of the present invention;

DETAILED DESCRIPTION OF THE INVENTION

The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are illustrative of ways to make and use the invention, and are not intended to limit the scope of the invention. Parallel reference numbers across figures refer to like elements for ease of reference. Reference numbers may also be unique to a respective figure or embodiment.

An exemplary system and method of dynamic and distributed control in an isolated power grid in accordance with the present invention comprises source and load modules. Source modules receive input from respective alternating current (AC) generators while load modules output to loads. Modules are interconnected by a set of cables. Cables provide both power distribution and hardwired communication between modules. Each module comprises its own microprocessor. Control of the power system, comprising both generation and distribution, is distributed across the system. Control adapts dynamically to changes in power network topology.

Figure 1:
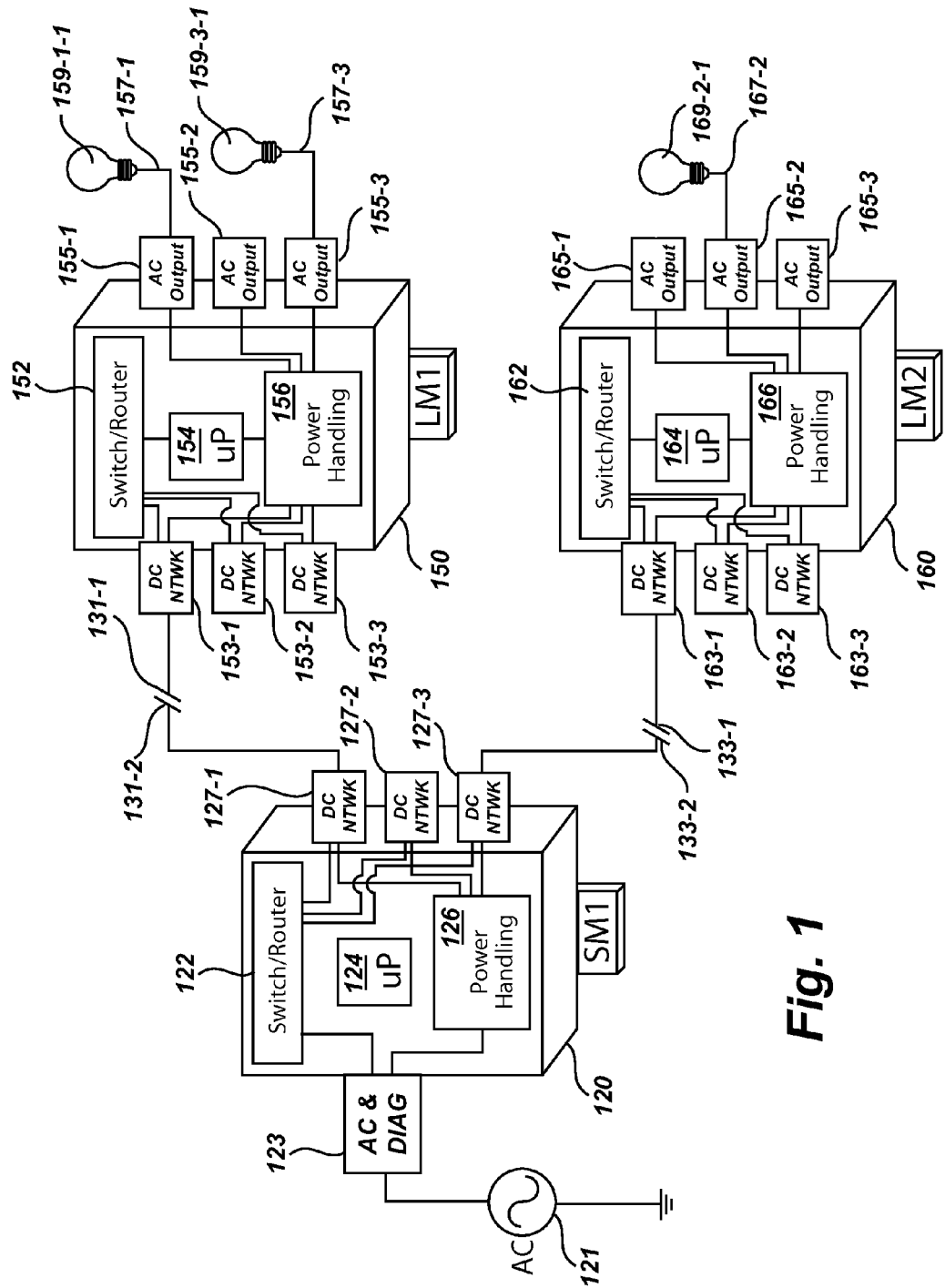
FIG. 1 shows an exemplary power grid system with a single generator, in accordance with an exemplary embodiment of the present invention.

FIG. 1 shows an exemplary power grid system with a single generator, in accordance with an exemplary embodiment of the present invention. Generator 121 feeds into an AC power and diagnostic unit 123. The AC power and diagnostic unit 123 output connects to source module SM1 120. Source module 120 includes a switch router 122, its own microprocessor 124 and power handling circuitry 126. Source modules convert generator AC power to high voltage direct current (DC) for distribution. DC output from source module 120 connects to DC power and network connection units 127-1, 127-2, and 127-3. These DC power and network connection units connect via a set of cables to DC power and network connection units which feed into load modules. A set of cables comprises at least two cables, one for power distribution and one for communication between modules, in accordance with embodiments of the present invention.

DC power and network connection unit 127-1 is shown connected to DC power and network connection units 153-1 via cables 131-1, 131-2. DC power and network connection unit 127-3 is shown connected to DC power and network connection units 163-1 via cables 133-1, 133-2. Power cables between DC power and network connection units are primary lines, cable 131-1, for example. DC power and network connection unit 127-1 is shown open. DC power and network connection units 153-1, 153-2, 153-3 feed into load module LM1 150. Load Module 150 includes a switch router 152, a microprocessor 154, and a power handling 156 unit. Load modules receive the high voltage DC power and convert it to AC for output to loads. AC outlet load connectors 155-1, 155-2, 155-3 are available to connect to desired loads. In the exemplary embodiment of FIG. 1, a load 159-1-1 is connected to load connector 155-1 via secondary line 157-1. Similarly, another load 159-3-1 is connected to load connector 155-3 via secondary line 157-3.

DC power and network connection units 163-1, 163-2, 163-3 feed into another load module LM2 160. Load Module 160 includes a switch router 162, a microprocessor 164, and a power handling 166 unit. As described above, load module 160 receives the high voltage DC power and converts it AC for output to loads. AC outlet load connectors 165-1, 165-2, 165-3 are available to connect to desired loads. In the exemplary embodiment of FIG. 1, a load 169-2-1 is connected to load connector 165-2 via line 167-2.

FIGS. 2A and 2B show exemplary source module map entries and load module map entries, respectively, in accordance with an exemplary embodiment of the present invention. Shown entries are exemplary not exhaustive, additional entries are included in alternate exemplary embodiments. Table 1, 220, of FIG. 2A shows Unit Identifications 241 in a first column with Unit Type 242 in the second column. Source Module Identification (ID) 240 is allocated a two byte unsigned integer. For illustrative purposes, referring to FIG. 1, the source module ID could be 120. The system map is comprised of map entries for each module in the system that is connected and powered on. The map is sorted by a unique system identifier for each module, the module ID 240. This module ID is created at the factory and will be universally unique. Port 1 connection ID 227-1-1 is allocated a 2 byte unsigned integer and corresponds to DC power and network connection unit 127-1 of source module 120 in FIG. 1. Referring again to FIG. 2A, Port 1 cable integrity 227-1-2 is allocated a 1 byte enumeration and corresponds to the cable integrity at DC power and network connection unit 127-1, FIG. 1. Port 2 and Port 3 connection IDs 227-2-1, 227-3-1 are similarly allocated two byte unsigned integers and correspond to DC power and network connection units 127-2 and 127-3, respectively, of FIG. 1. Cable integrities at Ports 2 and 3, 227-2-2 and 227-3-2 are again assigned a 1 byte enumeration and correspond to respective DC power and network connection units 127-2 and 127-3 of FIG. 1. And finally, generator power 221-4-1 and generator on/off status 221-4-2 are accorded a 4 byte single precision floating point and a 1 byte enumeration, respectively.

Table 2 250 of FIG. 2B shows exemplary load module map entries. Each entry is described relative to the exemplary system of FIG. 1. Unit Identification 261 and Unit Type 262 provide first and second column headings. While two load modules 150, 160 are shown in FIG. 1, map entries for only one load module are presented in FIG. 2B. Load Module ID 260 is allocated a 2 byte unsigned integer. Referring to FIG. 1, the load module ID may correspond to load module 150. As indicated above, the map is sorted by a unique system identifier for each module, the module ID. This ID is created at the factory and will be universally unique. Port 1 connection ID 153-1-1 is allocated a 2 byte unsigned integer and corresponds to DC power and network connection unit 153-1 of source module 120 in FIG. 1. Referring again to FIG. 2A, Port 1 cable integrity 153-1-2 is allocated a 1 byte enumeration and corresponds to the cable integrity at DC power and network connection unit 153-1, FIG. 1. Port 2 and Port 3 connection IDs 153-2-1, 153-3-1 are similarly allocated two byte unsigned integers and correspond to DC power and network connection units 153-2 and 153-3, respectively, of FIG. 1. Cable integrities at Ports 2 and 3, 153-2-2 and 153-3-2 are again assigned a 1 byte enumeration and correspond to respective DC power and network connection units 153-2 and 153-3 of FIG. 1.

Load module map entries also include the AC outlet load connectors 155-1, 155-2, 155-3 of FIG. 1. Outlet 1 priority 155-1-1 is allocated a 1 byte unsigned integer and corresponds to AC outlet load connectors 155-1 of load module 150 in FIG. 1. Outlet 1 connected state 155-1-2 is accorded a 1 byte enumeration and Outlet 1 aggregate resistance 155-1-3 is accorded a 4 byte single precision floating point. Outlets 2 and 3, corresponding to AC outlet load connectors 155-2 and 155-3 of FIG. 1, respective priority, connection state, and aggregate resistance entries. Outlet 2 priority 155-2-1 is allocated a 1 byte unsigned integer and corresponds to AC outlet load connectors 155-2 of load module 150 in FIG. 1. Outlet 2 connected state 155-2-2 is accorded a 1 byte enumeration and Outlet 2 aggregate resistance 155-2-3 is accorded a 4 byte single precision floating point. Outlet 3 priority 155-3-1 is allocated a 1 byte unsigned integer and corresponds to AC outlet load connectors 155-3 of load module 150 in FIG. 1. Outlet 3 connected state 155-3-2 is accorded a 1 byte enumeration and Outlet 3 aggregate resistance 155-3-3 is accorded a 4 byte single precision floating point.

Information stored in a table of source module map entries includes generator output power 221-4-1. In accordance with an exemplary embodiment of the present invention, reserve generation capacity is not available. Rather, generators are run at their recommended efficiency levels, perhaps 85% of the generator's maximum output. Source modules may have multiple generators attached to them, where Table 1, FIG. 2A shows one generator 121-1 connected to the source module. The source module map entries also include a generator status entry 121-1 of on, off, or failure. Source module tables also include information regarding the modules that are connected to the source module. For example, load module IDs of load modules connected to the source module, not shown, will be included in the source module map entries. And finally source module maps include an entry designating the integrity of a connected cable 227-1-2, which may be for example, open, connected, or failed.

Information stored in a table for load module map entries also includes describing modules connected there to 153-1-1. Again, Load module map entries also include three discriminators per AC outlet, for example 155-2-1, 155-2-2, 155-2-3. These entries per outlet include whether the outlet is connected to a load 155-2-2, where the load may be off. Each outlet has a load priority, for example 155-2-1. And finally, the maximum load, aggregate resistance, connected to each outlet is recorded, for example 155-2-3.

Figure 3:
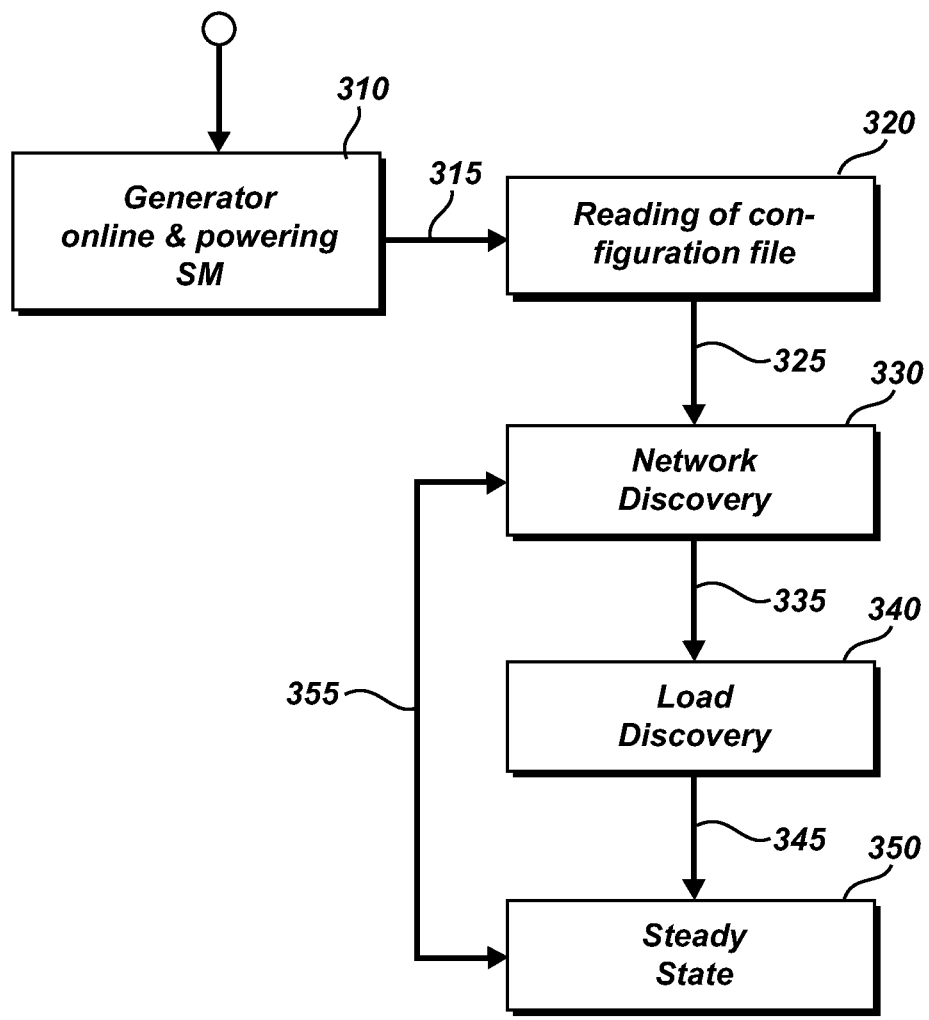
FIG. 3 shows a flow diagram of application states for a module in an isolated distribution grid, in accordance with an exemplary embodiment of the present invention.

When an isolated distribution grid in accordance with the present invention is first connected, modules are interconnected via cables and at least one generator is connected to a source module. The generator is turned on and brought online providing power to its respective source module. The source module will begin transitioning through a series of application states. FIG. 3 shows a flow diagram of application states for a module in an isolated distribution grid, in accordance with an exemplary embodiment of the present invention. After starting up the generator, bringing the generator online, and powering the source module 310, the module moves 315 to a configuration state. The module's processor reads the module's configuration file 320. The configuration file includes the module's unique identifier. After reading in the entire configuration file, the module transitions to a second state 325 of network discovery. In the network discovery state 330, the module will attempt to communicate via communication cables with other modules connected to the subject module. The network discovery state is further described with reference to FIG. 4 below. The source module will provide power to connected modules, if necessary. Once the network is discovered, the source module moves 335 to the load discovery state 340. Once the condition of loads discovered 345 is reached, the source module transitions 345 to a steady state 350. In accordance with an exemplary embodiment, load discovery is autonomous. The module remains in steady state until a change to the system occurs. Changes that disrupt steady state may include the addition of new loads, addition of another source module and generator into the distribution grid, or a change in DC power cable interconnections between modules.

Figure 4:
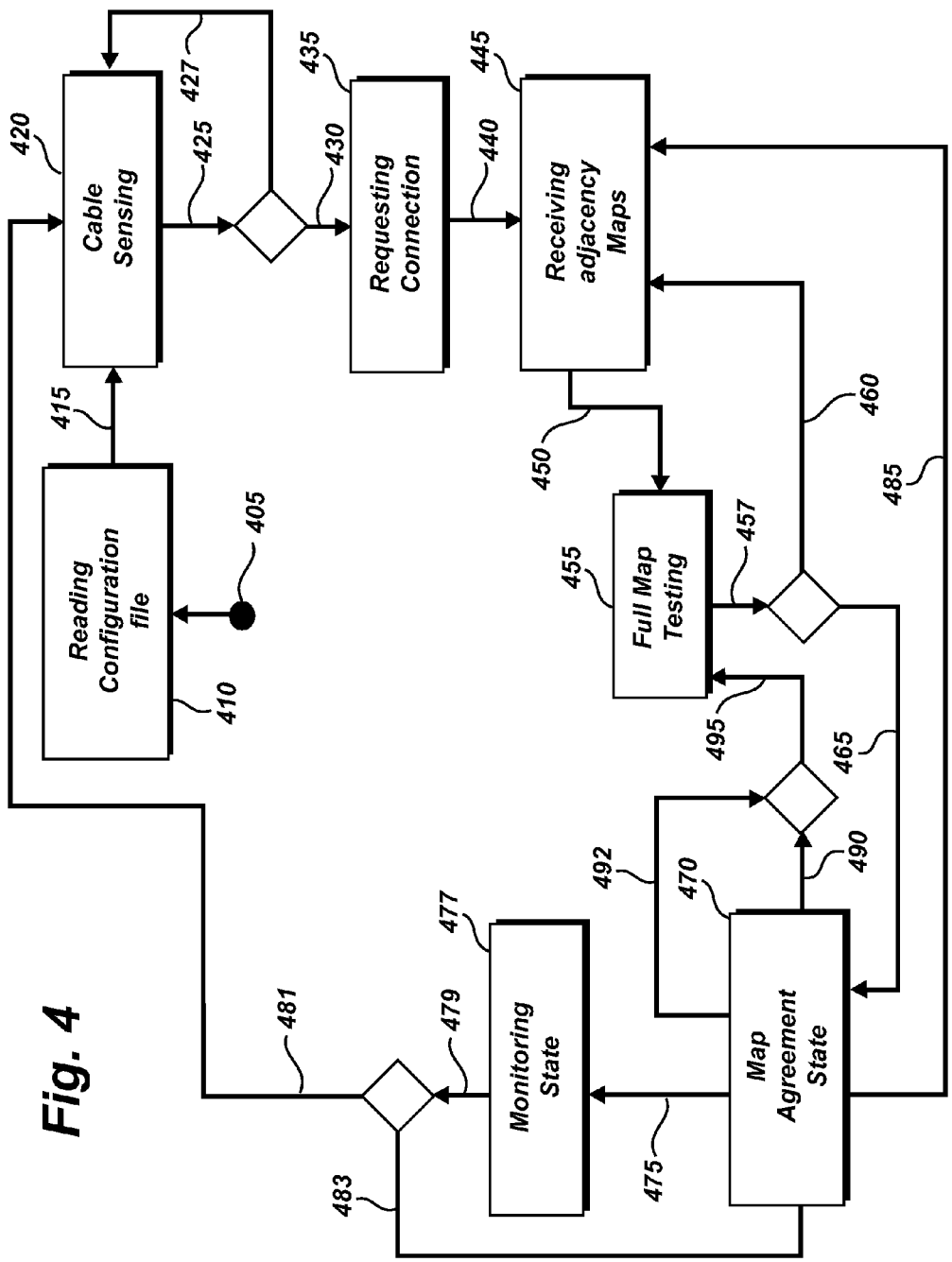
FIG. 4 shows a portion of FIG. 3 in greater detail, a state diagram for network discovery, in accordance with an exemplary embodiment of the present invention.

FIG. 4 shows a portion of FIG. 3 in greater detail, a state diagram for a network discovery state, in accordance with an exemplary embodiment of the present invention. Starting 405 from the reading of the configuration file state 410, the source module transitions 415 into the network discovery state after all the parameters have the configuration file have been read 415. The first step of the network discovery state is cable sensing 420. The algorithm of cable sensing is described in further detail with reference to FIG. 5. Cable sensing is performed on each of the DC power output ports of the source module, for example 127-1, 127-2, and 127-3 in FIG. 1.

Figure 5:
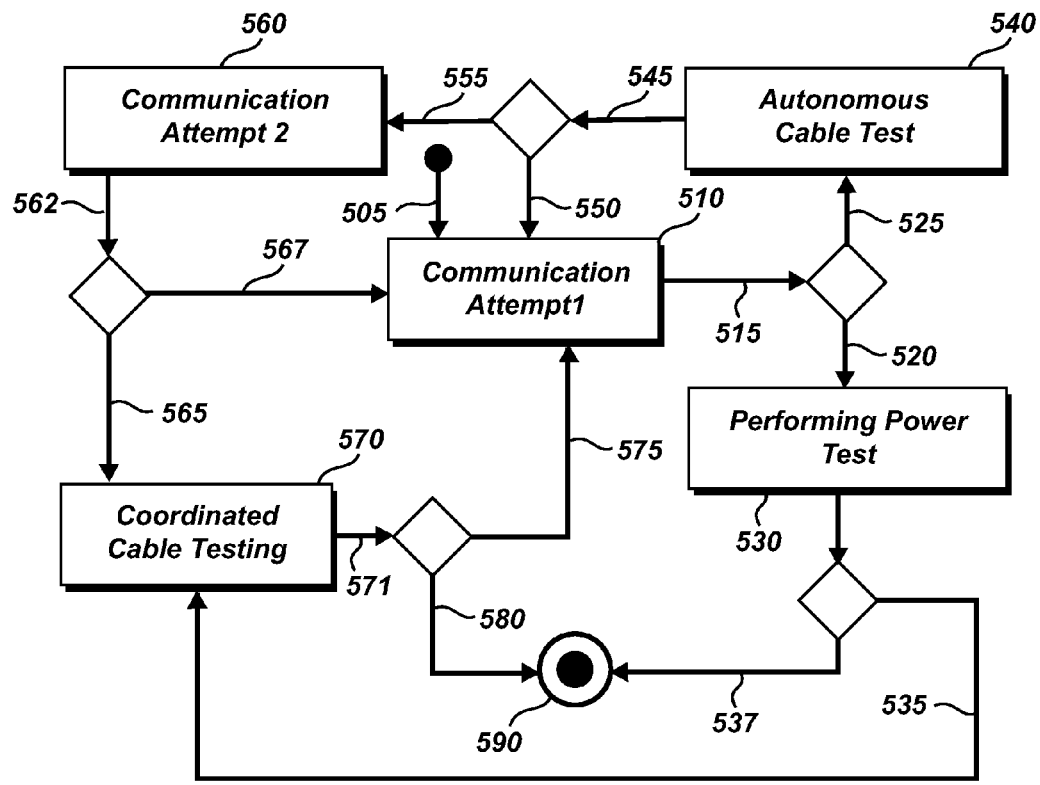
FIG. 5 shows a portion of FIG. 4 in greater detail, a state diagram for cable detection and testing, in accordance with an exemplary embodiment of the present invention.

From the cable sensing state 420, the source module sends out an initial communication attempt, message 425. A timer is set to await a response. If a response is received, cable sensing conditions are passed, 430 and a power test is passed for each port, then the module moves to the requesting connection phase 435. If a response is not received 427, the module remains in the cable sensing state 420. FIG. 5 shows a portion of FIG. 4 in greater detail, a state diagram for cable detection and testing, in accordance with an exemplary embodiment of the present invention. Referring to FIG. 5, the source module enters the cable sensing state 505 and proceeds to a state of first communication attempt 510.

FIG. 5 shows an exemplary method for sensing port to port connections and communicating across these connections. The source module's processor will employ cable sense to ascertain the presence of a downstream port. Whether the downstream module currently has power or has power but is presently in an off state is ascertained. If needed, a port relay is closed to provide power to the module. A hierarchy of module ID number is employed to determine a coordinated order of communication between two modules. A power test is employed to verify connection integrity for transmission of high voltage power.

An initial connect message is sent 515 and a timer is set to await a response. If a response is received 520, a power test is performed 530. The power tests verifies connection integrity for high power transmission. If the power test passes 537, then that port moves 590 to the connection request state of FIG. 4. If the power test passes 537, the high voltage power relay can be closed.

If time lapses after the cable sense message, the first communication attempt, is sent out and before a response is received 525, the module enters an autonomous cable test state 540. At the autonomous cable test state, the port is tested for the presence of a communication cable 545. If a cable is present 555, the port enters a second communication state 560 and a second communication attempt message is sent 562. If no response is received, a relay of the subject port is closed 567, providing power to the subject DC power cable, in an attempt to provide power to the downstream module, and the source module returns to the step of first communication attempt 510. The downstream module may already have power via another port. A defect may prevent a power connection across the subject pair of ports.

If a response to the second communication attempt is received 565, the source module enters the coordinated cable testing phase 570. If the cable present test 545 fails 550, the module returns to the first communication attempt state 510. If the autonomous cable present test fails, the subject module can still move onto the requesting connection state 435 of FIG. 4, since not all ports of a module may be connected with respective power and communication cables. Returning to the first communication attempt state 550 because a cable present test 545 fails 550, may end cable sensing for the subject port. When returning to the first communication attempt state 550 because a second communication attempt 562 fails and a relay is closed to provide power to the downstream module 567, then at least another cycle of communication and cable sensing proceeds.

If a response to the first communication message is received 520, a power test is performed 530. If the cable passes the power test, the distribution relay is closed 537 and the cable sensing for the subject cable pair ends 590. If the power test fails 535, the module enters the coordinated cable testing phase 570. If either a second communication attempt, cable sense message sent 562, fails or a power test fails 535, a coordinated cable test is conducted 571. If the cable passes the coordinated cable test, the distribution relay is closed 580 and cable sensing ends 590. If the coordinated cable testing fails 575, the distribution relay is opened and the module returns to the first communication attempt state 510 for the subject port. If a pair of ports reach the coordinated cable test state, the port of the module with the lower module ID will initiate communication with the higher module ID port. The coordinated cable test provides a protocol for communication between two load modules. The coordinated cable test includes a power test, in accordance with the exemplary embodiment shown in FIG. 5.

Referring again to FIG. 4, once communication and power testing are passed 430 for each port that has a cable connected, a connection request is sent 430. In the connection request state 430, each port sends information to connecting ports describing, for example, its respective module ID and module type. Once those messages are received and processed 440, the module enters the receiving adjacency maps phase 445, or receiving unmerged maps state 445. Each port in the system sends connected ports its current adjacency map 450. The data from received adjacency maps is merged into each module's current adjacency map forming full maps 450. In the full map testing state 455 the full maps are exchanged 457 to check for consistency of full maps across ports. If connected ports have identical full maps, the given port can transition, full maps pass 465 to the map agreement state 470. If the maps do not agree, lack consistency across full maps, the port transitions via full maps fail 460 to the receiving adjacency map state 445 and the subject port receives and sends adjacency maps again. Data from received adjacency maps is again merged 450 to form full maps 455. And exchange of full maps between two ports is performed 457 again to check for consistency of adjacent maps at the subject port. While maps are being exchanged 457 and merged 450, with respect to a given port, the same process happens, perhaps in parallel, at the remaining two ports of the subject module. In turn, the data could get out of sync, requiring a second attempt at receiving maps, merging data, and exchanging maps to check for consistency or agreement.

Figure 6:
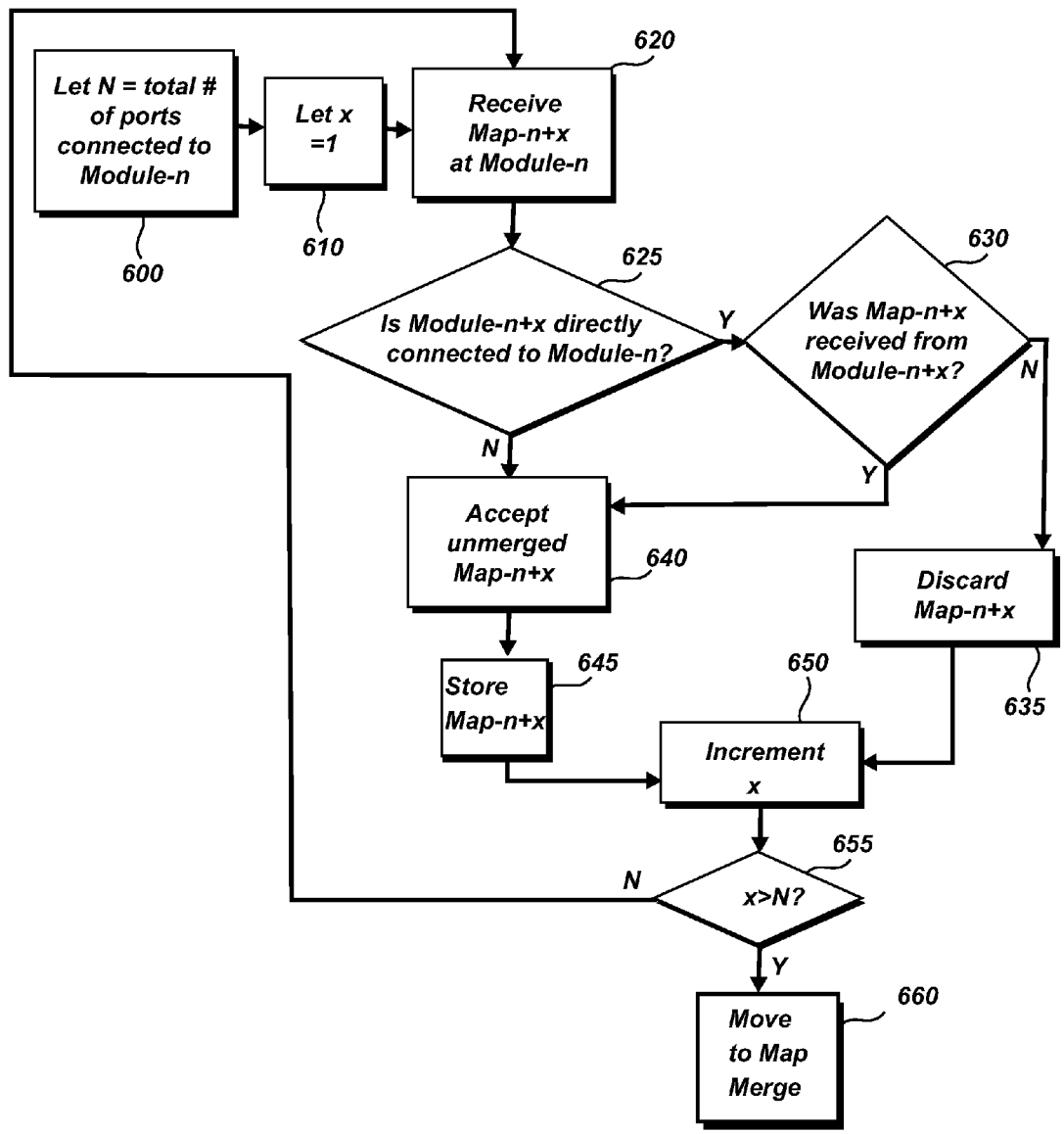
FIG. 6 shows a method of accepting unmerged adjacency maps, in accordance with an exemplary embodiment of the present invention.

There are rules adhered to in reaching the map agreement state of network discovery. FIG. 6 shows a method of accepting unmerged adjacency maps, in accordance with an exemplary embodiment of the present invention. First, set N equal to the total number of ports connected to port-module-n 600. Then set variable x equal to one 610. Receive adjacency MAP-n+x at port module-n 620. Is the module-n+x directly connected to module-n? 625 If yes, was MAP-n+x received from module-n+x? 630 If yes, accept the unmerged adjacency MAP-n+x 640. If module-n+x is not directly connected to module-n, then accept the unmerged adjacency MAP-n+x 640. If, however, MAP-n+x was not received from module-n+x but module-n+x is directly connected to module-n, then discard MAP-n+x 635. Increment x by one 650. Check whether x is greater than N 655. If x is greater than N, then move to map merge action, 450 in FIG. 4. If x is less than or equal to N, then receive MAP-n+x' at module-n 620 and continue until x is greater than N 655. If X is greater than N 655, then the port moves to map merging 450 of the network discovery, shown in FIG. 4. The latest map received from a module that is not directly connected to the subject port replaces the previous corresponding adjacency map, Referring again to FIG. 4, once exchange of full maps 457 results in consistencies across the board, the port transitions to the map agreement state 470. The method of map merging 450 and exchanging 457 continues until all ports transition 465 to the map agreement state 470. Periodically, the state of the system is assessed by collecting and reviewing health data, and the module contemporaneously enters 475 a monitoring state 477 while in the map agreement state 470. If the health data 479 is acceptable, the module continues 483 in the map agreement state 470. If the health data 479 is not acceptable, the module returns 481 to the cable sensing state 420, in accordance with an exemplary embodiment of the present invention.

All ports eventually reach the map agreement state 470, shown in FIG. 4, and the system will transition 335 from network discovery 330 to load discovery 340, shown in FIG. 3. Upon completion of load discovery, the system moves 345 from load discovery state 340 to steady state 350. Steady state 350 can be disrupted by multiple factors. A load increase or decrease, for example, at an already loaded outlet, and the system will move 355 from steady state 350 to network discovery state 330 again.

The port of the module to which a load was added 490 or decreased 492, leaves the map agreement state 470 via a map change transition 490, 492. For load value updating, the module sends the changed map entry to its neighbor, or receives a change from a neighbor. The change is updated in both modules, which then move to the full maps state 495. Full maps are exchanged 457 and if they agree, the ports transition back 465 to the map agreement state 470. If the disruption to steady state is a new map entry, then the ports transition 485 to the receiving adjacency map state 445 and the system proceeds as described above until a map agreement state 470, shown in FIG. 4, is reached and in turn, steady state 350, shown in FIG. 3.

Figure 7:
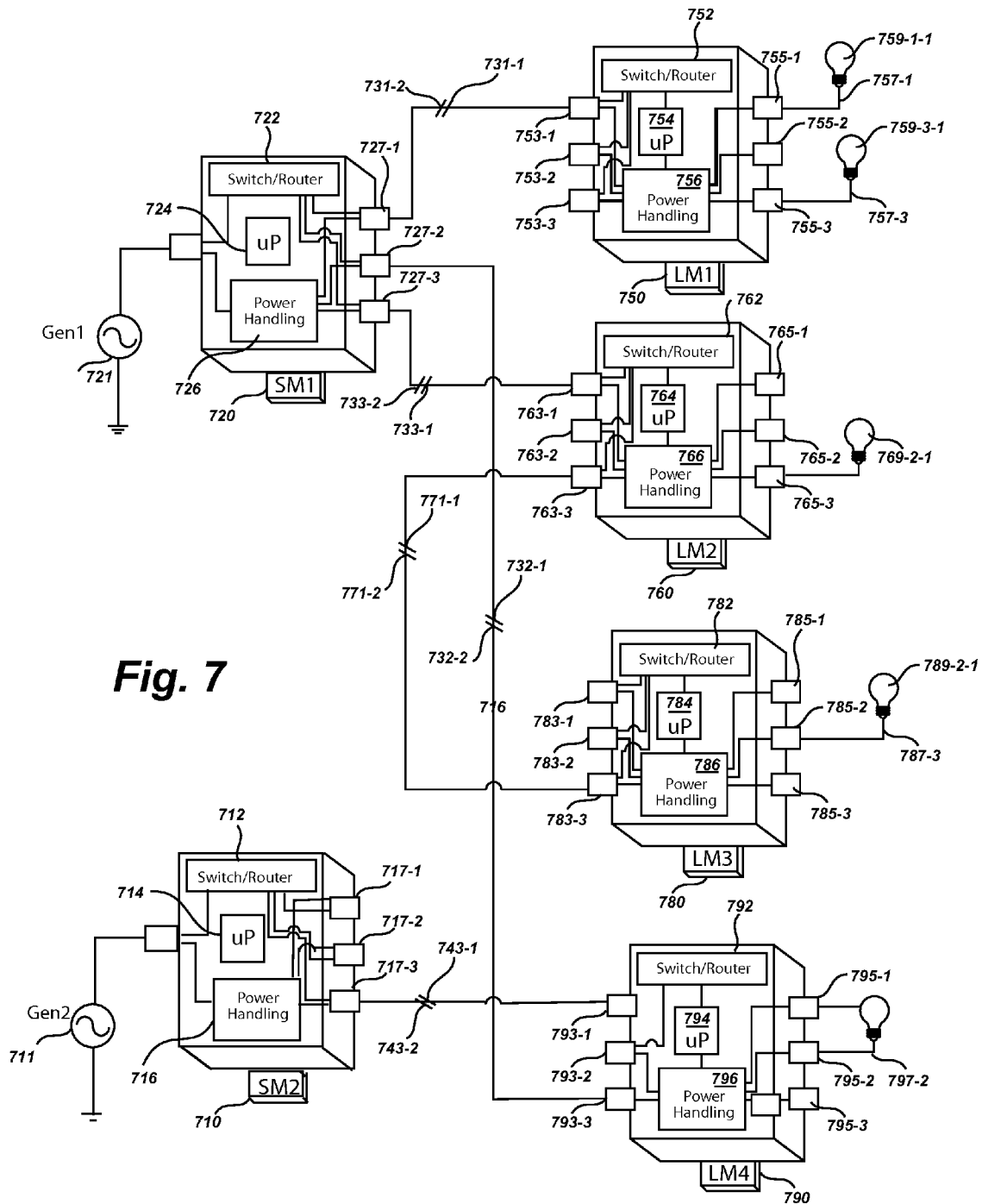
FIG. 7 shows an exemplary power grid system with a single generator and power distribution between load modules, in accordance with an exemplary embodiment of the present invention.

A deletion of a map entry will transition the system to the network discovery state 330 of FIG. 3 and more particularly, receiving of adjacency maps 445 in FIG. 4. It is possible that reconfiguration of an existing system may lead to a splitting of one distribution system into two systems, each with its own respective generator. Referring to FIG. 7, one source module 720 feeds three load modules LM1, LM2 and LM4, 750, 760, 790 directly. DC power and network connection unit 727-1 is shown connected to DC power and network connection unit 753-1 of load module LM1 750 via cables 731-1, 731-2. DC power and network connection unit 727-3 is shown connected to DC power and network connection units 793-3 of load module LM4 790 via cables 732-1, 732-2. DC power and network connection unit 727-3 is shown connected to DC power and network connection unit 763-1 of load module LM2 760 via cables 733-1, 733-2. Load module LM2 760 connects to load module 3 LM3 780 from its DC power and network connection unit 763-3 to DC power and network connection unit 783-3 of load module LM3 780 via cables 771-1, 771-2. Source module SM2 710 also connects to LM4 790. DC connection 717-3 connects to DC connection 793-1 of LM 4 790 via cables 743-1, 743-2. In FIG. 7 all modules are interconnected into one distribution system comprising four load modules and two source modules.

Figure 8:
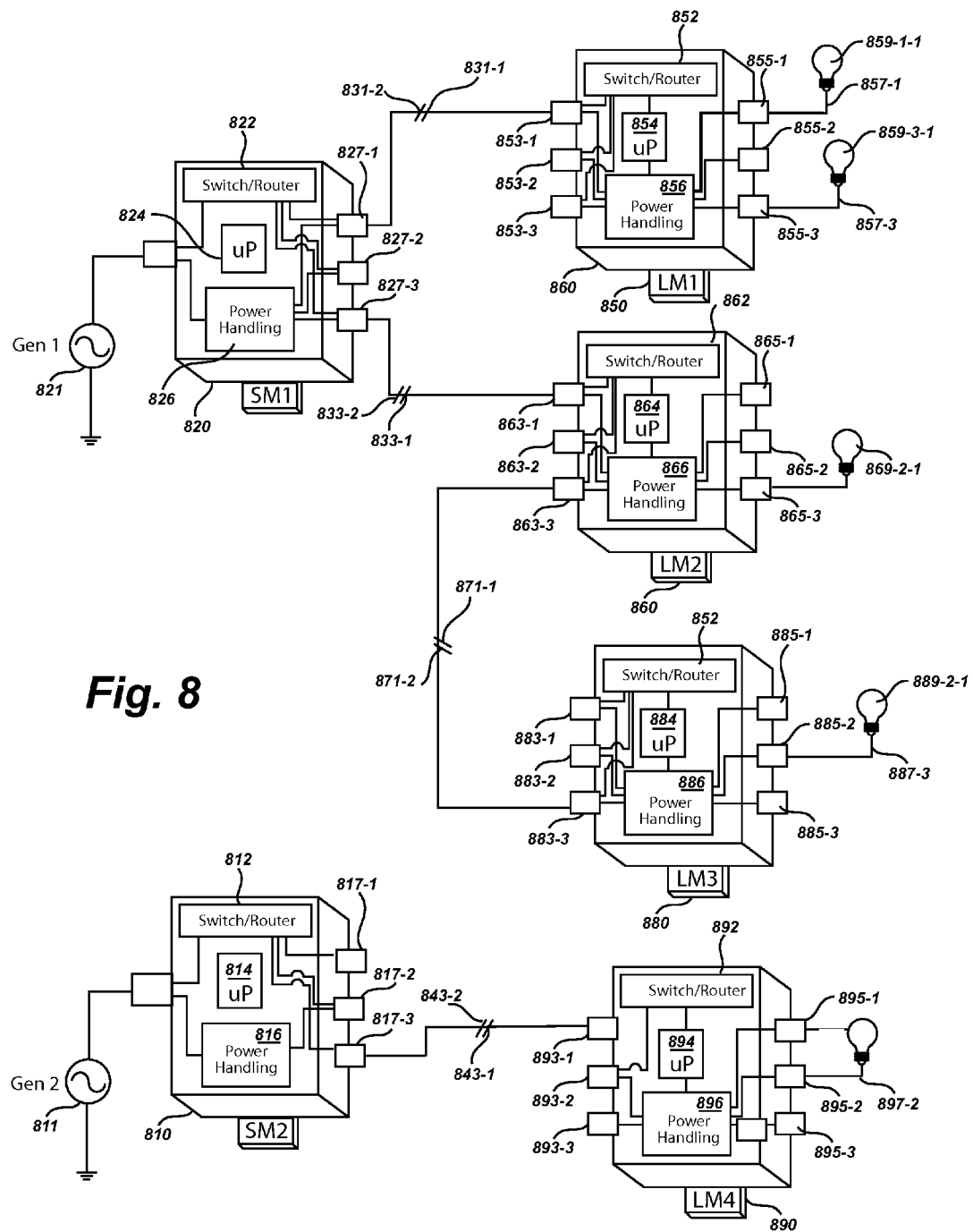
FIG. 8 shows an exemplary power grid system with two generators and splitting one distribution system into two systems, in accordance with an exemplary embodiment of the present invention.

Referring to FIG. 8, the two cable connection from SM1 820 from DC connection 827-2 to LM4 890 at DC connection 893-3 has been removed or disconnected. This disconnection will be entered into the respective unmerged maps as a deletion. Due to the point to point nature of a system, in accordance with an exemplary embodiment of the present invention, this map deletion will split the one network of FIG. 7 into the two separate networks of FIG. 8. Once the cables 732-1 and 732-2 are removed, there is no longer a connection between the lower two modules, SM2 710 and LM4 790 and the upper four modules. When the module SM1 720 detects that it can no longer communicate with module LM4 790, it needs to update its adjacency map with map entry deletions. For the case in which connection with a subject module is lost, all map entries for the unconnected module are deleted from the original network merged map. The network transitions to the network discovery, 330 in FIG. 3. All map entries are deleted except for the module ID entry for the units themselves, configuration files are not purged, and the modules exchange unmerged maps and move back to the unmerged maps state. This is due to the fact that removing the map entry for LM4 is not sufficient to have a correct map. The map entry for SM2 must also be removed from the map. Unmerged maps are rebuilt with those modules that remain a part of the system as each unit senses remaining connections. Referring to FIG. 4, maps are exchanged 457 as described above and eventually converge again with all ports returning to the map agreement state 470. Referring to FIGS. 7 and 8, the top system network adjacency map now lacks modules SM2 710 and LM4 790, and the same two modules comprise a new system, which yield its own network adjacency map. The loads in the two distribution systems of FIG. 8 are the same loads as those in FIG. 7.

The present invention readily adapts to changes in the system. By using a distributed control design and point to point connections, the present system is less vulnerable to sabotage or mishap. The loss of a module, or microprocessor does not render the system non-functional. The system adjusts automatically to newly added or subtracted loads. Users can alter the distribution grid ad hoc.

A system in accordance with the present invention has point to point connections between modules. All messages travel through these point to point connections, in turn a message sent from one module to another may transmit through multiple modules in reaching its destination. There is no main module, monitoring, tracking, or controlling the system and its respective modules. With the distributed control design of the present system, there is no command module sending commands to all remaining modules in the system. Each module performs calculations based on the current information which it has with respect to the system's status, loading, and capacities. Each module performs functions based on its calculations and system information. A distributed control system, in accordance with an exemplary embodiment of the present invention makes consistent calculations and actions across all modules. In accordance with the present invention, the modules obtain the same input to the algorithms that drive the system, enabling a consistency in executed steps across the distribution system. The input to the algorithms is an adjacency map of the system, entries of which are shown in FIGS. 2A and 2B.

Referring to FIG. 3, once the network discovery state is complete, the modules transition 335 to load discovery state 340. In load discovery an algorithm turns on each load in the system in a specific order. The algorithm that determines the order in which the loads are turned on uses the adjacency map that was created in the network discovery state. All modules have the same copy of the adjacency map, and thus have the same algorithm running on the same input. The loads are turned on one at a time. As a load is turned on, that load information is added to the respective map entries for the activating load module and the changed map entry is shared with the network. Thus, during load discovery, the network state oscillates between network discovery 330 FIG. 3 and load discovery 340. When each new load is brought online, network discovery proceeds from receiving adjacency maps 445 to map agreement state 470, FIG. 4, to confirm that all modules have record of the new load in the system before proceeding to turn on the next load.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiments and after consideration of the appended claims and drawings.

What is claimed is:

1. A power distribution grid, the grid comprising:
   an AC generator;
   a source module electrically connected to the AC generator, the source module comprising:
      a microprocessor,
      a memory;
      a power handling unit converting AC power to high voltage DC power,
      wherein, the source module receives AC generated power from the generator and outputs DC high voltage power and the microprocessor independently controls the source module;
   at least one load module electrically connected to the source module, the at least one load module comprising;
      a microprocessor;
      a memory;
      a power handling unit converting the DC high voltage DC power to AC power;
      at least one AC outlet;
   at least one pair of a first cable and a second cable electrically connecting the source module to an at least one load module;
   wherein, the source module outputs DC high voltage power on the first cable, and wherein the at least one load module receives DC high voltage power from the source module on the first cable and the microprocessor independently controls the at least one load module;
   wherein the second cable transmits communications between the source module and the at least one load module;
   a load connected to an at least one AC outlet;
   a microprocessor in every source module connected to the power distribution grid, respectively, and independently controlling the every source module without utilizing logic distributed across the power distribution grid;
a microprocessor in every load module connected to the power distribution grid, respectively, and independently controlling the every load module without utilizing logic distributed across the power distribution grid;
a memory in every source module, respectively;
a memory in every load module, respectively; and
wherein, the microprocessor of the source module autonomously discovers a topology of the power grid upon initial start up of the power grid; and further comprising:
adjacency maps stored in respective memories of the every source module and the every load module, the adjacency maps comprising point to point communication and power connections and load data.

2. The grid according to claim 1, wherein:
the adjacency maps stored in the respective memories of the every module are in agreement and the power distribution grid is in steady state.

3. The grid according to claim 1, wherein:
the adjacency maps stored in the respective memories of the every module are not in agreement and the power distribution grid is in a network discovery state.

4. The grid according to claim 1, wherein:
adjacency maps further comprise: point to point communication connections between any two modules which are connected by a first cable transmitting DC high voltage power.

5. A power distribution grid, the grid comprising:
an AC generator;
a source module electrically connected to the AC generator and connected to the power distribution grid, the source module comprising:
  a microprocessor;
  a memory;
  a power handling unit converting AC power to high voltage DC power,
  wherein, the source module receives AC generated power from the generator and outputs DC high voltage power;
at least one load module electrically connected to the source module and connected to the power distribution grid, the at least one load module comprising;
  a microprocessor;
  a memory;
  a power handling unit converting the DC high voltage DC power to AC power;
  at least one AC outlet;
at least one pair of a first cable and a second cable electrically connecting the source module to an at least one load module;
wherein, the source module outputs DC high voltage power on the first cable, and wherein the at least one load module receives DC high voltage power from the source module on the first cable;
wherein the second cable transmits communications between the source module and the at least one load module;
a load connected to an at least one AC outlet;
a microprocessor in every source module connected to the power distribution grid, respectively;
a microprocessor in every load module connected to the power distribution grid, respectively;
a memory in the every source module, respectively;
a memory in the every load module, respectively; and
wherein, the microprocessor of the source module autonomously discovers a topology of the power grid upon initial start up of the power grid; and further comprising:
wherein, the power distribution grid lacks a central command module; and the microprocessor in the every source module and the every load module execute independent control without utilizing logic distributed across the power distribution grid.

6. A method of controlling a power distribution grid, the method comprising:
using an at least one source module connected to the power distribution grid;
using an at least two load modules connected to the power distribution grid;
electrically connecting one of the at least one source modules to at least one of the two load modules via a pair of cables;
electrically connecting each of the at least two load modules to the at least one source module or the other of the two load modules via another pair of cables;
incorporating in and dedicating a microprocessor and a memory into every source module and into every load module connected to the power distribution grid, respectively;
executing a network discovery algorithms in a microprocessor in the source module and in each of the two load modules and in the microprocessor of any module connected to the system, respectively without utilizing logic distributed across the power distribution grid;
independently generating an adjacency map comprising module ID and connection data in the microprocessor of each respective module;
storing a copy of the independently generated adjacency map in a memory of the respective modules;
transmitting the generated adjacency map across a first cable of the pair of cables to connected modules;
receiving transmitted adjacency maps and independently merging received adjacency maps with the stored copy of the generated adjacency map;
exchanging merged maps across connected modules; and
if exchanged maps agree, transitioning to a steady state and independently controlling connected modules via the respective microprocessor in the source module and in each of the two load modules, respectively, controlling the power distribution grid.

7. The method according to claim 6, further comprising:
if exchanged maps do not agree transitioning to generating an adjacency map comprising module ID and connection data in the microprocessor of modules with maps that do not agree;
storing a copy of the generated adjacency map in a memory of the respective modules;
transmitting the generated adjacency map across a first cable of the pair of cables to connected modules;
receiving transmitted adjacency maps and merging received adjacency maps with the stored copy of the generated adjacency map;
exchanging merged maps across connected modules; and
if exchanged maps agree, transitioning to a steady state and controlling the power grid based on the agreed maps across connected modules via the microprocessor in the source module and in each of the two load modules, respectively.

8. The method according to claim 6, further comprising:
connecting an generator to an input of a source module.

9. A method of determining a network topology in a power distribution grid, the method comprising:

reading a configuration file at a microprocessor of a source module;
sending a cable sense message out of each source module port;
if a response to the sent cable sense message is received, performing a power test;
if a cable passes the power test, closing a distribution relay;
if the performed power test fails, performing a coordinated cable test;
if the performed coordinated cable test passes, closing a distribution relay;
If the performed coordinated cable test fails, setting a distribution relay to open;
sending a connection request via the closed distribution relays to connected ports
receiving the connection request at the connected ports and sending module identification and port data to a connected source module port;
entering a receiving adjacency maps phase;
receiving adjacency maps at respective ports and accepting qualified received adjacency maps;
merging the accepted qualified adjacency map data entries;
entering a full maps phase;
exchanging full maps across connected ports;
comparing exchanged full maps for consistency;
when exchanged full maps are consistent, entering a map agreement state for respective connected ports;
determining the network topology from a full map when all ports having closed distribution relays have entered the map agreement state; and
incorporating in and dedicating to every source module and every load module connected to the power distribution grid a microprocessor, respectively;
generating a full map in the microprocessor of the every respective load module;
generating a full map in the microprocessor of the every respective source module;
exchanging full maps across connected ports of all load modules and across all ports of source modules connected to the power distribution grid;
independently comparing exchanged full maps for consistency in the microprocessor of the every respective module;
when exchanged and independently compared full maps are consistent, independently entering a map agreement state for respective connected ports without utilizing logic distributed across the power distribution grid.

10. The method according to claim 9, further comprising:
if exchanged maps are inconsistent across connected ports, transitioning respective ports to the receiving adjacency maps phase.

11. The method of claim 10, further comprising:
qualifying a received adjacency map of a directly connected port from the directly connected port.

12. The method of claim 10, further comprising:
disqualifying a received adjacency map of a directly connected port from an indirectly connect port.

13. The method of claim 10, further comprising:
qualifying a latest received adjacency map of an indirectly connected port.

14. The method of claim 10, further comprising:
if a response to the sent cable sense message is not received, entering an autonomous cable present test phase at a respective source module port;
if the cable present phase passes, sending another cable sense message out of the respective source module port.

* * * * *